(12) United States Patent
Haberkorn

(10) Patent No.: US 6,493,124 B1
(45) Date of Patent: Dec. 10, 2002

(54) LOOPING BACK SIGNALS IN OPTICAL SWITCHES

(75) Inventor: Ronald A. Haberkorn, Stow, MA (US)

(73) Assignee: Tellabs Operations, Inc., Lisle, IL (US)

(*) Notice: Subject to any disclaimer, the term of this patent is extended or adjusted under 35 U.S.C. 154(b) by 0 days.

(21) Appl. No.: 09/361,936

(22) Filed: Jul. 27, 1999

(51) Int. Cl.⁷ .............................................. H04B 10/02
(52) U.S. Cl. ......................... 359/174; 359/179; 385/16
(58) Field of Search ................................ 359/174, 179; 385/16, 18, 27; 370/243

(56) References Cited

U.S. PATENT DOCUMENTS

| | | | |
|---|---|---|---|
| 4,041,381 A | 8/1977 | Hwa ........................... 324/533 |
| 4,211,920 A | 7/1980 | Wakabayashi .............. 359/177 |
| 4,266,183 A | 5/1981 | Steensma et al. ........... 324/521 |
| 4,300,239 A | 11/1981 | Wakabayashi et al. ...... 359/177 |
| 4,660,973 A | 4/1987 | Mannschke ................ 356/73.1 |
| 4,727,592 A | 2/1988 | Okada et al. ............ 359/119 X |
| 4,744,105 A | 5/1988 | Kasper ....................... 359/193 |
| 4,887,309 A | 12/1989 | Andersson et al. ......... 359/110 |
| 5,010,544 A | 4/1991 | Chang et al. ................ 370/243 |
| 5,210,703 A | 5/1993 | Hodgson .................... 359/179 |
| 5,224,149 A | 6/1993 | Garcia ..................... 379/22.01 |
| 5,251,001 A | 10/1993 | Dave et al. ................ 356/73.1 |
| 5,315,674 A | 5/1994 | Asako ......................... 385/15 |
| 5,361,315 A * | 11/1994 | Lewis et al. .................. 385/16 |
| 5,367,395 A | 11/1994 | Yajima et al. .............. 359/110 |
| 5,649,036 A | 7/1997 | Anderson et al. ............ 385/16 |
| 6,031,946 A * | 2/2000 | Bergmann et al. ............ 385/18 |
| 6,353,692 B1 * | 3/2002 | Colbourne ................... 385/16 |

FOREIGN PATENT DOCUMENTS

JP 10-206754 * 8/1998

OTHER PUBLICATIONS

"Scalable Optical Switch Using Rotating Refractive Plates," Dale Murray et al., National Fiber Optics Engineers Conference, Sep. 13–17, 1998, Orlando, FL.

* cited by examiner

Primary Examiner—Thomas Mullen
(74) Attorney, Agent, or Firm—Fish & Richardson P.C.

(57) ABSTRACT

An optical switch for routing optical signals includes ports located on the optical switch and a refractive plate that may be oriented to passively loop back an optical signal from one of the ports to the same one of the ports.

15 Claims, 7 Drawing Sheets

TABLE 1: OPTICAL CONNECTIVITY

| Plate Orientations | | | Apparent Optical Axis Position | Optical Connectivity | |
|---|---|---|---|---|---|
| 122 | 123 | 124 | | 0 | 0' |
| F | F | F | h | 8 | 8' |
| F | F | E | g | 7 | 7' |
| F | E | F | f | 6 | 6' |
| F | E | E | e | 5 | 5' |
| E | F | F | d | 4 | 4' |
| E | F | E | c | 3 | 3' |
| E | E | F | b | 2 | 2' |
| E | E | E | a | 1 | 1' |

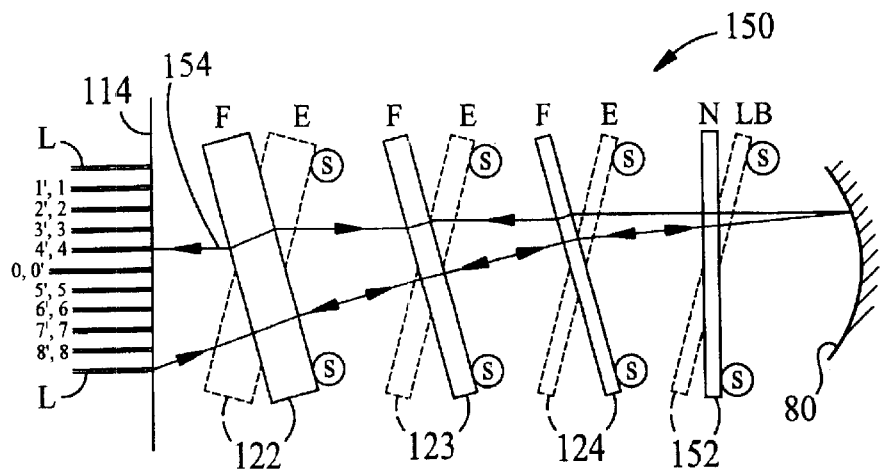
FIG. 7A
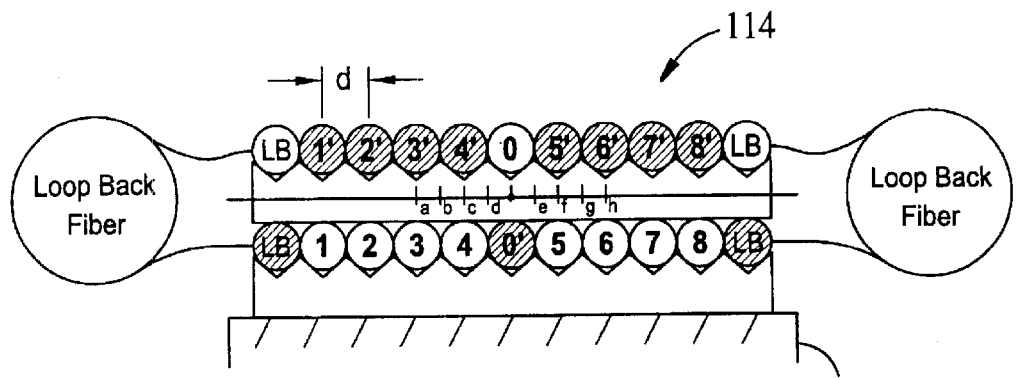
FIG. 7B
TABLE 2: OPTICAL CONNECTIVITY
| Swutch Position | | | Apparent Optical Axis Postion | Optical Connectivity | |
|---|---|---|---|---|---|
| 122 | 123 | 124 | | from | to |
| F | F | F | h | 4 | 4' |
| F | F | E | g | 3 | 3' |
| F | E | F | f | 2 | 2' |
| F | E | E | e | 1 | 1' |
| E | F | F | d | 8 | 8' |
| E | F | E | c | 7 | 7' |
| E | E | F | b | 6 | 6' |
| E | E | E | a | 5 | 5' |
FIG. 7C

LOOPING BACK SIGNALS IN OPTICAL SWITCHES

BACKGROUND OF THE INVENTION

The invention relates generally to optical networks and, more particularly, to testing components in an optical network.

In an optical network, a signal may go through many optical components while traveling along a network path between a source node and a destination node. The form of the path may be selected through mechanical optical switches distributed through the network. Some conventional switches employ movable refractive plates to select the switch connectivities defining the path.

If any component along the path of a signal functions poorly, the signal received at a destination node may be of poor quality. To determine why a received signal is of poor quality, a system manager must generally test each optical component along the network path taken by the signal.

Testing each component along an optical path may be difficult, because the paths are large or inaccessible. The paths may be long, because the optical network may span more than a hundred miles. The network components, e.g., optical fibers, can also have dimensions of tens or hundreds of miles. In smaller optical networks found in optical devices, the optical paths may be inaccessible. For example, some optical devices enclose the optical network in a sealed box, which is difficult to look inside or open.

A network can be tested by transmitting a signal into the network and detecting the signal at remote monitoring points. The detector may use active monitoring devices located at the remote points, e.g., photo-detectors. The active devices may be either permanently or temporarily inserted into the signal path. Permanently inserted devices can reduce optical signal intensities. Temporarily inserted devices may be difficult to use due to the size of network components and may be expensive due to the number of devices needed to monitor the whole network.

Other prior art techniques for testing an optical network are manual and involve inserting a patch cord at a remote location to monitor signals. Manual testing of signal networks having many optical components can be slow. Such manual testing methods can produce unacceptably long down times.

The present invention is directed to overcoming, or at least reducing, one or more of the problems set forth above.

SUMMARY OF THE INVENTION

In a first aspect, the invention provides an optical network for transmitting optical signals between a plurality of nodes. The optical network includes a plurality of optical conduits and a plurality of optical switches. Each node couples to one of the optical conduits. The optical switches have ports coupling to the optical conduits to form connected paths between associated pairs of the nodes. The paths have first and second modes of operation. In the first mode, one of the paths transmits an optical signal between the associated pair of nodes. In the second mode, the one of the paths transmits an optical signal from a node through a partial portion of the path and reroutes the same optical signal back to the same node.

In a second aspect, the invention provides a method of testing a component of an optical network. The method includes transmitting an optical signal from a node of the optical network through a path that the component is on and passively looping the same optical signal back to the node. The method also includes analyzing the passively looped back optical signal.

In a third aspect, the invention provides an optical switch for routing optical signals between ports of the switch. The switch includes a refractive plate that may be oriented to passively loop back an optical signal from one of the ports to the same one of the ports.

In a fourth embodiment, the invention provides an optical switch to reroute incoming optical signals. The optical switch includes a plurality of ports to hold optical fiber ends, a focusing reflector to reflect light incoming from the ports, and a plurality of refractive plates. The refractive plates are located along paths of light rays going from the ports to the focusing reflector. Each refractive plate has two working orientations. A loop back arrangement of the working orientations reroutes light incoming from one of the ports to the focusing reflector and back to the same one of the ports.

BRIEF DESCRIPTION OF THE DRAWINGS

Other objects, features, and advantages of the invention will be apparent from the following description taken together with the drawings in which:

FIG. 7A is a side view of another embodiment of an optical switch with both transmission and loop back modes;

FIG. 7B is a front view of the plane in which the ends of optical fibers entering the switch of FIG. 7A are located; and FIG. 7C is a table relating plate positions to connectivities of the switch of FIGS. 7A and 7B in the loop back mode.

DESCRIPTION OF THE PREFERRED EMBODIMENTS

Figure 1:
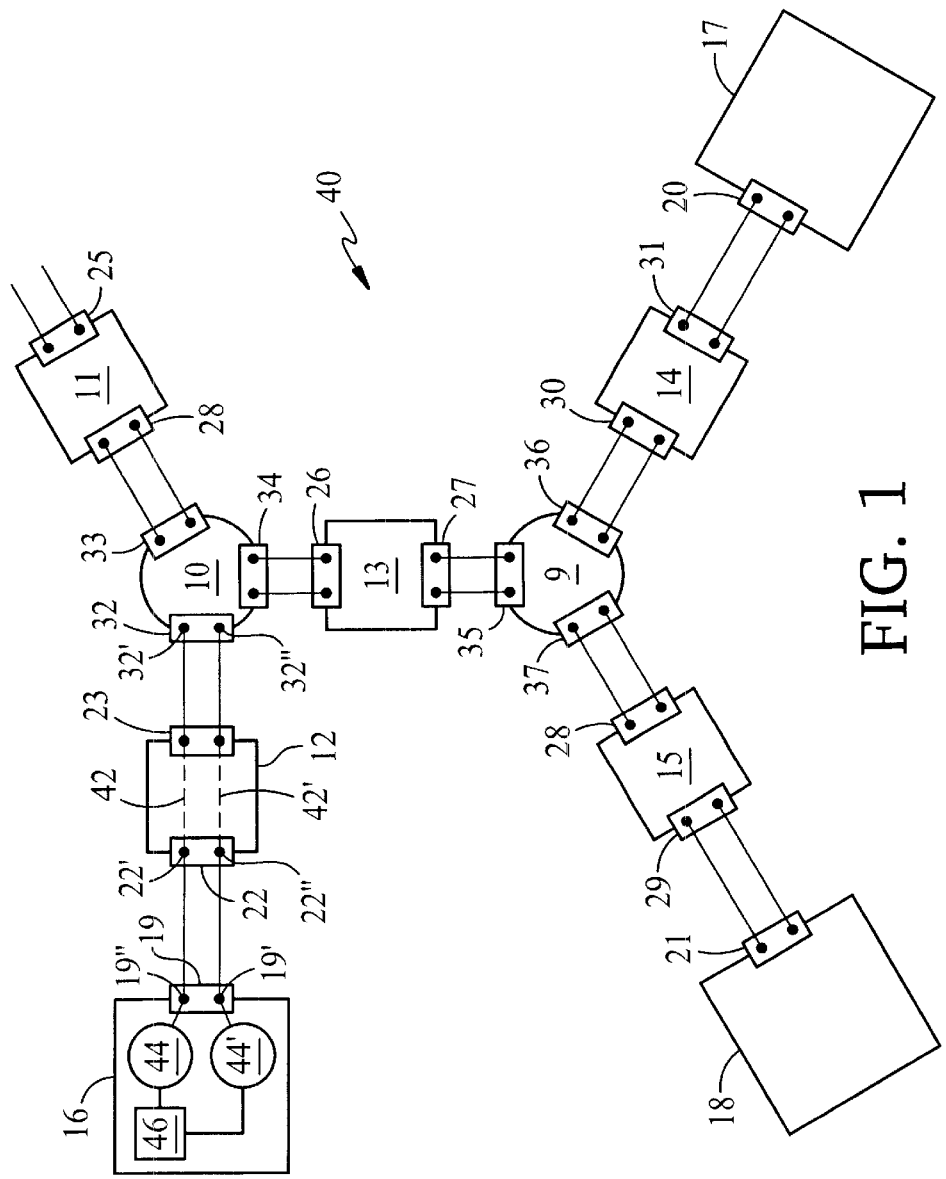
FIG. 1 is high-level block diagram of a portion of an optical network.

FIG. 1 is high-level block diagram of a portion of an optical network 40 according to an embodiment of the present invention. The network 40 has a plurality of components 9–15 that connect to each other and to network nodes 16–18. Each component 9–15 has multiple ports 22–37 that connect the component 9–15 to the other components 9–15 and/or nodes 16–18. Each node 16–18 has a port 19–21 that connects the associated node 16–18 to one of the components 12, 14, 15.

Each port 22–37, 19–21 has a paired input and output, e.g., the port 22 has input 22' and output 22". The paired inputs and outputs support two-way communications in the network 40 in which optical signals travel in a single direction in separate physical channels of the optical conduits. Herein, an optical conduit is a device that transports an optical signal between two fixed ports. For example, the component 12 is an optical waveguide in which a pair of separate optical fibers 42 and 42' carry signals from the port 22 to the port 23 and signals from the port 23 to the port 22, respectively. Thus, component 12 is an optical conduit.

Each node 16–18 has a transmitter and a receiver of optical signals connected to the input and output of the node's port 19–21. For example, in the node 16, a transmitter 44 and a receiver 44' couple to the respective output 19" and the input 19' of the port 19.

The optical components 9–15 include two-port devices 11–15, such as optical waveguides, amplifiers, filters, and programmable optical switches 9–10. Optical switches have three or more ports, which can serve as inputs and/or outputs is for optical signals. The optical switches 9–10 reroute optical signals from one of ports 35–37, 32–34 to a selected one of the remaining ports 35–37, 32–34. Each optical switch 9–10 may use movable refractive and/or optical reflective devices to route optical signals between different network branches. The optical switches 9–10 have paired internal waveguides (not shown) so that communications traveling between two ports 32–34, 35–37 in different directions travel in separate waveguides.

Henceforth, rerouting is defined to be a passive process in which the same optical signal is redirected in a new direction without intermediate conversion. For example, mirrors and refractive plates reroute signals. Transceivers, in which a receiver converts an incoming optical signal into an electrical signal and uses the electrical signal to cause a transmitter to transmit an optical signal, do not perform rerouting.

Rerouting redirects optical signals without the need for active optical devices that detect an incoming optical signal and then generate a new redirected optical signal. Such active devices can be costly and complex. Thus, networks that use rerouting for optical switching may be less expensive and simpler to maintain than networks using active switching devices.

The network 40 may implement any known network topology and have any size. For example, the network 40 may be implemented on an interstate optical communications network having a length of about 100 miles. The network 40 may also be implemented on a complex optical network located in a bench-top optical device. It should be appreciated that the invention should not be limited to any particular form for the network.

Each path between a pair of source and destination nodes 16–18 can operate in either transmission mode or test mode. In the transmission mode, a pair of the nodes 16–18 send each other optical signals along the path. In the test mode, one of the nodes 16–18 acts as both the sender and the receiver for optical signals. The optical signals travel through a portion of the path in the network 40 and then the same signals loop back to return to the same sending node 16–18, i.e., traveling in the paired waveguide of each optical component 9–15 previously crossed.

Each node of network 40 has an analyzer, a transmitter, and a receiver. For example, the node 16 includes analyzer 46 that is coupled to the associated transmitter 44 and receiver 44'. In the test mode, the analyzer 46 compares transmitted and returned signals to determine whether the characteristics of the returned signals satisfy preset quality limits. The analyzer 46 may measure signal parameters that include signal intensity, delay, inter-symbol spacing, number of counts above-threshold, signal to noise ratio, bit-error rate, waveform shape, dispersion, clock accuracy, and other signal parameters. The analyzer 46 may be implemented by using any known circuit or technique.

Figure 2:
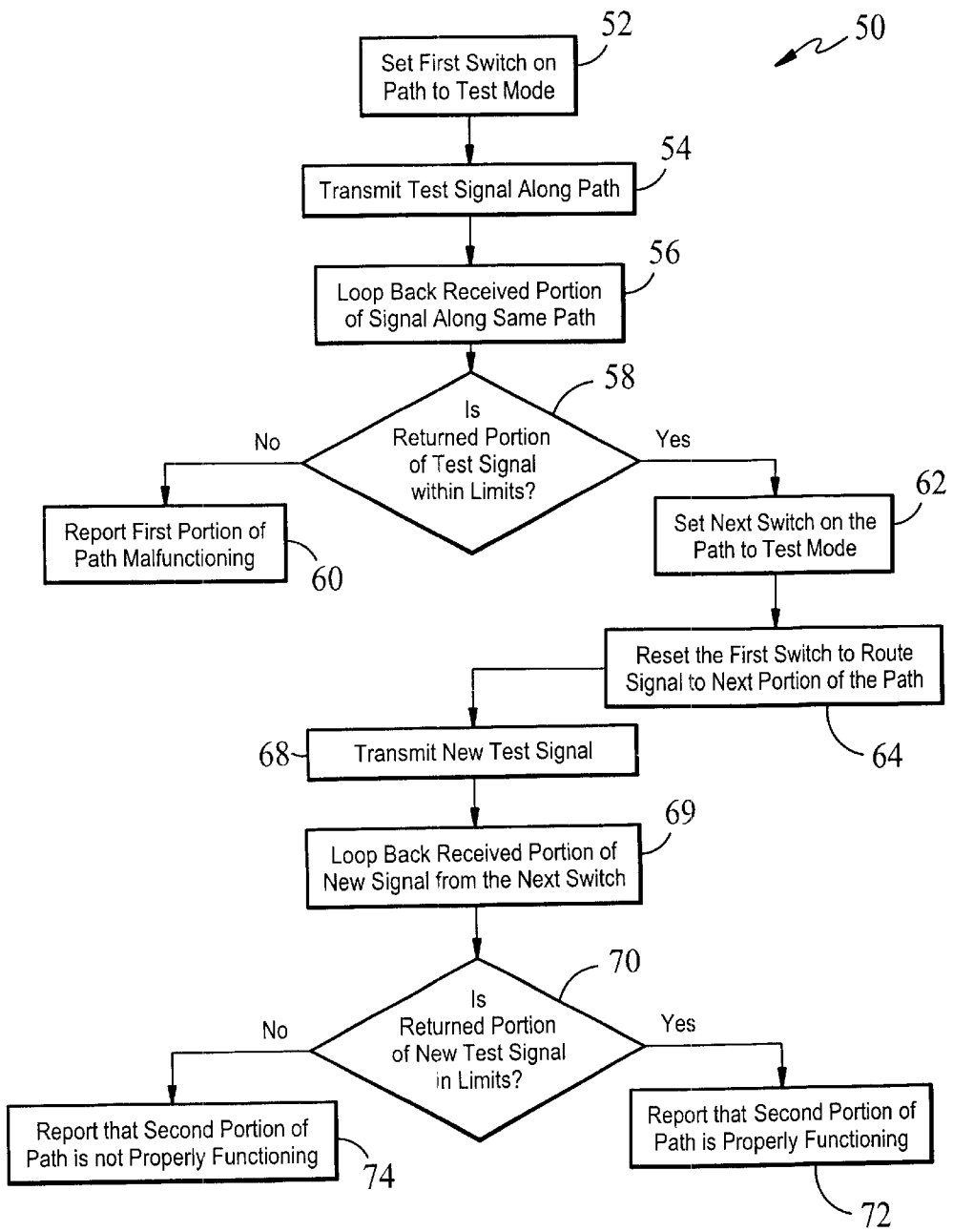
FIG. 2 is a flow chart illustrating a method of testing an exemplary path in the network of FIG. 1.

FIG. 2 is a flow chart illustrating a method 50 of testing a selected optical path, i.e., the path between the node 16 and the node 18. At block 52, the first optical switch along the path is set to the loop back mode, i.e., the switch 10 is set to the loop back mode. According to an embodiment of the present invention, a network manager (not shown) may set the mode of the switches 9, 10. The network manager may be computerized. At block 54, the node 16 transmits an optical test signal to the path. At block 56, the switch 10 loops an incoming portion of the test signal back to the same port 32 from which the signal came. The signal incoming from the input 32' is rerouted back to the output 32" of the same port 32. Then, the rerouted portion of the test signal travels back through the same portion of the path to the node 16 that originally transmitted the test signal.

Next, the analyzer 46 analyzes the returned portion of the test signal, at decision block 58, to determine whether the properties of the returned signal satisfy preset quality limits. At block 60, the analyzer 46 reports that the first portion of the path is malfunctioning in response to the returned signal not satisfying the preset limits. At block 62, the network manager sets the next switch on the path, i.e., the switch 9, to the loop back rerouting mode in response the returned signal from the first portion of the path satisfying the preset limits. At block 64, the node 16 also resets the earlier switch 10 to reroute signals to the next branch of the selected path, i.e., to a transmission or switching mode. At block 68, the same node 16 transmits a new test signal to the path under test. At block 69, the switch 9 passively loops back the received portion of the new test signal.

Next, the analyzer 46 determines, at block 70, whether the returned portion of the new test signal is within the preset test limits. At block 72, the analyzer 46 reports that the second portion of the path is properly functioning in response to the returned signal satisfying the preset quality limits. The second portion of the path includes components 10 and 13 in FIG. 1. At block 74, the analyzer reports that the second portion of the path is improperly functioning in response to the returned signal not satisfying the preset quality limits. Thus, the method 50 enables testing paths of the network 40 using active optical devices 44, 44', 46 located at a single node 16–18 and passive loop back, i.e., rerouting, by the internal switches 9, 10 of the network 40.

Figure 3A:
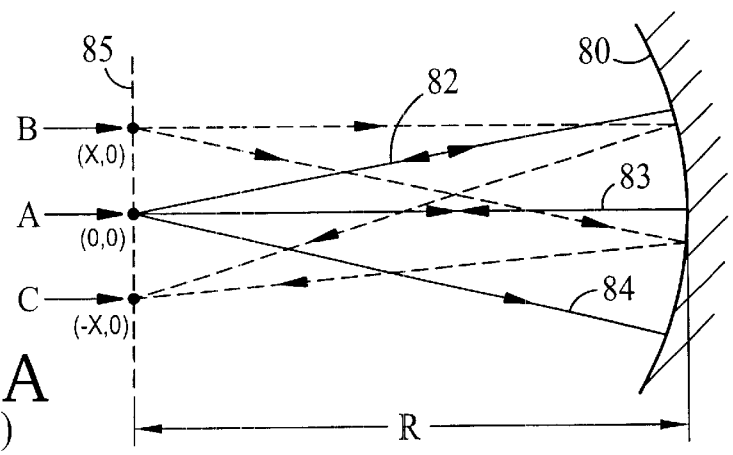
FIG. 3A is a side view of a prior art spherical mirror.

FIG. 3A shows a prior art spherical mirror 80 of radius R used in the optical switches 9, 10 of FIG. 1. The mirror 80 has a central optical axis 83. Point A is the intercept of the central optical axis 83 on a plane 85 normal to the axis 83 and at distance R from the mirror 80. Thus, A is the center of the spherical mirror 80.

"The mirror 80 reflects light rays 82–84, which are emitted by the point A, back towards the same point A. The mirror 80 focuses light emitted by a point B, located at a vertical distance X above the mirror's center A, to a point C, located at about the same vertical distance X below the center A. Sources at a distance R from the mirror 80 form images at an equal distance on the opposite sides of the principal axis 83."

Figure 3B:
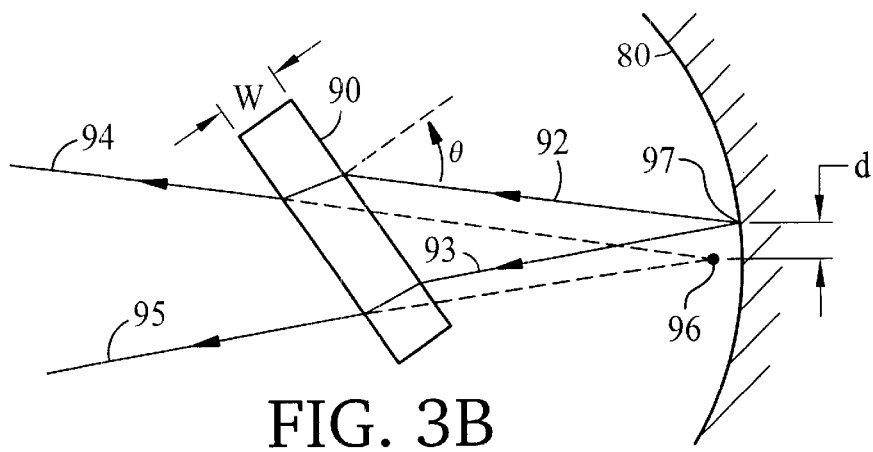
FIG. 3B is a side view showing production of a virtual image by a glass plate located in front of the mirror of FIG. 3A.

FIG. 3B illustrates virtual image formation by light rays 92, 93 emitted by the prior art spherical mirror 80 and refracted by a glass plate 90. The plate 90 laterally displaces each ray 92, 93 to produce a new ray 94, 95, displaced by a distance "d" about equal to (θ) (W) (1−N$^{-1}$), without changing the directions of the rays 92, 93. Here, θ is a small working angle between the incident ray 92, 93 and the normal to the plate 90, W is the thickness of the plate 90, and N is the index of refraction of the plate 90. The above relationship defines the working angle θ in terms of W, N, and a selected value of the displacement d. The rays 94, 95 appear to come from a virtual source point 96, vertically displaced by a distance, d, from the actual source point 97.

Figure 3C:
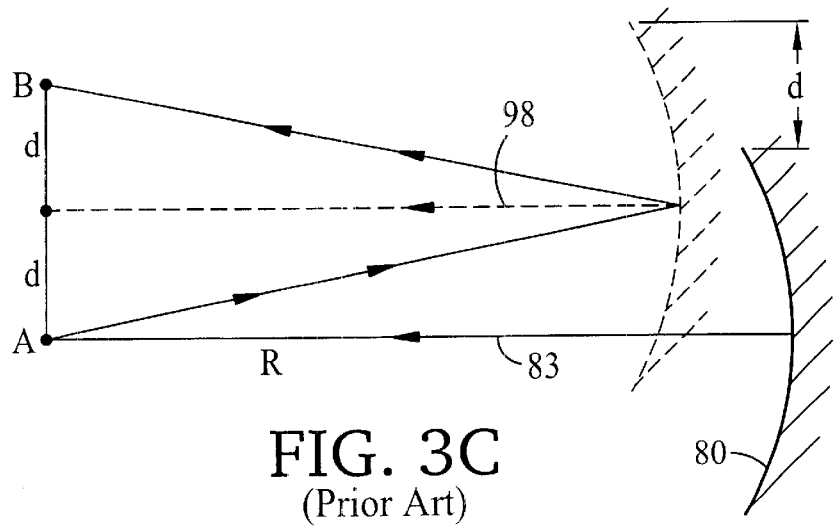
FIG. 3C is a side view illustrating how a virtual lateral displacement of the mirror of FIG. 3A produces an off axis image.

FIG. 3C illustrates the effect of laterally displacing light emitting points on the mirror 80 by "d=X/2. The displacement results in an image of the point A being produced at the point B, which is a distance 2d above the point A. The apparent optical axis 98 gives the appearance of being laterally displaced with respect to the actual optical axis 83 by approximately d. The apparent axis 98 concept describes image formation when tilted refractive plates are arranged along the path of light rays, e.g., the plate 90 of FIG. 3B. The arrangement of the tilted refractive plates determines the displacement defining the position of the apparent optical axis for the mirror 80.

Figure 4A:
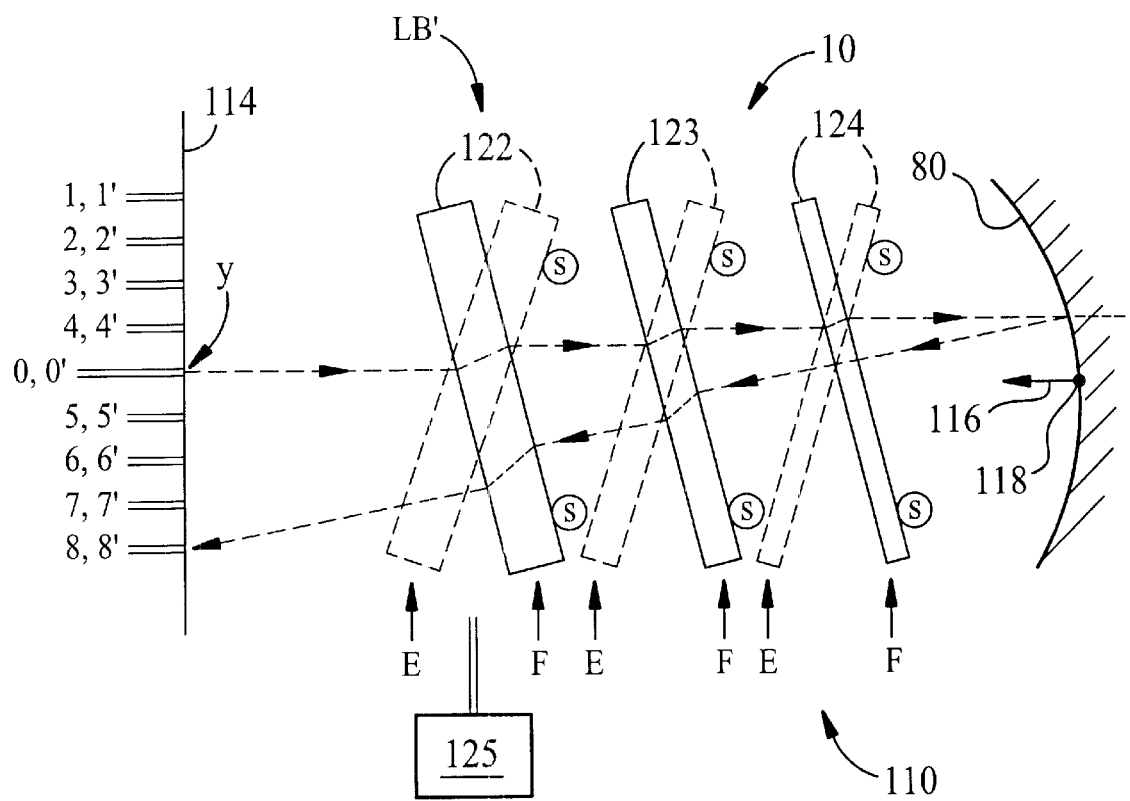
FIG. 4A is a side view of an optical switch.

FIG. 4A shows a side view of one embodiment of an optical switch 110 having both transmission and loop back modes. The switch 110 has nine ports, each port holding a paired set of optical fibers 0,0'; 1, 1'; . . . ; 8,8'. The switch 110 reroutes incoming optical signals from the central fiber 0 to a selected one of the remaining fibers 1–8 and reroutes incoming optical signals from a selected one of the fibers 1'–8' to the fiber 0'. The ends of the fibers 0–8 and 0'–8' are located along a plane 114 normal to optical axis 116 of the spherical mirror 80 and are adjacent the center y of the mirror 80. The plane 114 is at a distance about equal to the radius R of the mirror 80 from the mirror's optical center 118.

Figures 4B, 4C:
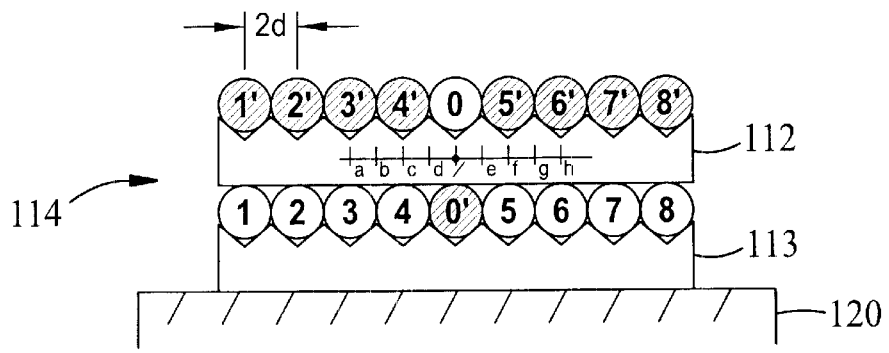
FIG. 4B is a front view of the plane from which the ends of the optical fibers enter the switch of FIG. 4A.
FIG. 4C is a table relating working orientations of the refractive plates of the switch of FIGS. 4A and 4B to the signal switching performed.

FIG. 4B shows a front view of the plane 114 showing the locations of the ends of fibers 0–8, 0'–8'. Clamps 112, 113 fix the ends of the fibers 0–8 and 0'–8' to a rigid platform 120 in a two-rowed arrangement. Distances between adjacent fibers 0–8, 0'–8' of each row are about "2d". The optical axis of each fiber, 0–8, 0'–8' is substantially normal to the plane 114.

Referring again to FIG. 4A, the optical switch 110 includes three plates 122–124 of respective thicknesses 5W, 2W, and W. It should be appreciated that the present invention is not limited to embodiments in which the plates 122–124 have these widths. Each plate 122–124 refractively displaces light rays traveling between the fibers 0–8, 0'–8' and the mirror 80 as described in relation to FIGS. 3A–3C. The plates 122–124 couple rotatably to the platform 120 and can rotate between a pair of binary working orientations "E" and "F" in the transmission mode. The plate 122 takes a third working orientation LB' in the loop back mode. The working orientations E and F are defined by the locations of pairs of mechanical stops S. At each binary working orientation E, F, the normal to each plate 122–124 makes the same working angle θ with respect to the optical axis 116 of the mirror 80.

The values of the working orientations of all of the plates 122–124 determine the paths of light rays in the switch 110. The values of the working orientations define a lateral displacement of the optical axis 116 to the position of an apparent optical axis (not shown in FIG. 4A). The position of the apparent optical axis determines which of the fibers 1–8 and 1'–8' couple to the central fibers 0, 0' as has been described in relation to FIG. 3C.

FIGS. 4B and 4C show the intersects a–h of the apparent optical axis of the mirror 80 on the plane 114 for various arrangements of the binary working orientations of each plate 122–124 in the transmission mode. The actual optical axis 116 intersects the plane 114 at central point "y", and the apparent optical axis intersects the points a–h on the plane 114. For each arrangement of the binary working orientations of the three plates 122–124, the central fibers 0 and 0' optically connect to the one of the fibers 1–8 and 1'–8' listed in FIG. 4C.

In the loop back mode, the refractive plates 122–124 of the optical switch 110 take specific working orientations. The plate 122 takes a third working orientation LB' for which the normal to the plate 122 makes an angle of about (0.2)Θ with respect to the optical axis 116. The plates 123 and 124 take respective working orientations. E and F for which the normal vector (not shown) to each plate 123, 124 makes an angle Θ with respect to the optical axis 116. For this arrangement of the working orientations, the plates 122–124 do not produce an overall lateral displacement of a light ray 134 emitted by the fiber 0 in the loop back mode. The light ray 134 from the fiber 0 back loops back to the paired fiber 0' at the same port.

An electro-mechanical device 125 may change the working orientation of the refractive plate 122. In particular, the electro-mechanical device may be able to stop the rotation of the refractive plate 122 at the working orientation LB' for the loop back mode. In some embodiments, the electro-mechanical device 125 is digitally programmable.

Figure 5:
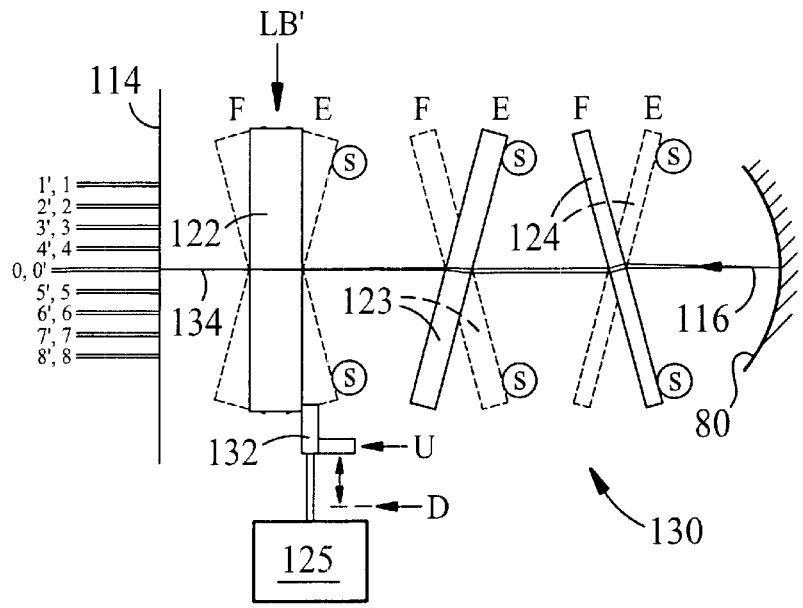
FIG. 5 is a side view of an embodiment of an optical switch having both transmission and loop back modes.

FIG. 5 is a side view of a particular embodiment 130 of the optical switch 110 of FIGS. 4A–4C that supports both transmission and loop back modes. The switch 130 has the components and features already described in the switch 110 shown in FIGS. 4A–4C. The switch 130 also has a slidable stop 132. When in the down position D, the stop 132 does not limit rotations of the plates 122–124 between working orientations E and F. Thus, the down position D of the stop 132 produces the normal switching or transmissions mode of the switch 130.

When slid to the up position U, the stop 132 stops the rotation of the thickest refractive plate 122 at the working orientation LB'. Thus, the up position U of the stop 132 mechanically fixes the working orientation of the plate 122 so that the switch 130 is in the loop back mode. The movement of the stop 132 between its working positions may be accomplished by the electro-mechanical device 125 or by any other technique known in the art.

Figure 6:
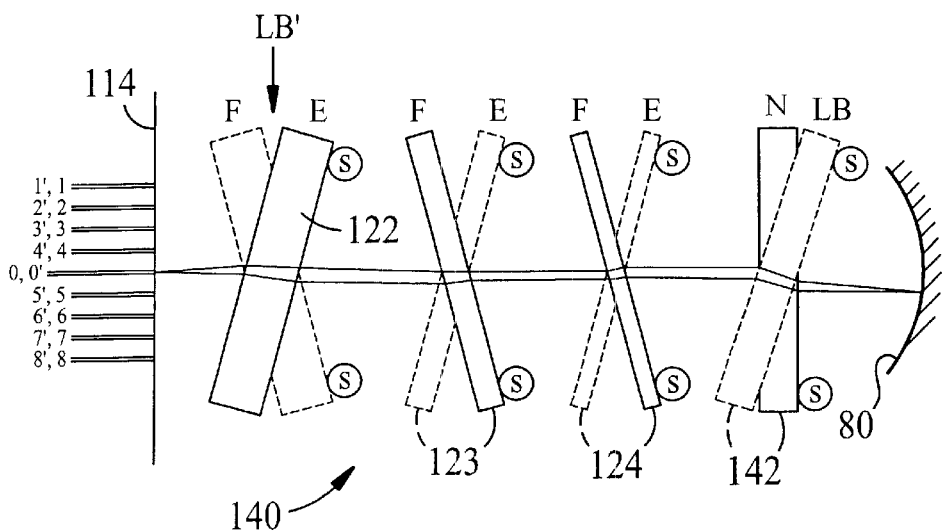
FIG. 6 is a side view of another embodiment of an optical switch having both transmission and loop back modes.

FIG. 6 shows an optical switch 140 supporting both transmission and loop back modes according to another embodiment of the invention. The switch 140 has the components and features of the switch 110 as shown in FIGS. 4A–4C. In addition, the switch 140 includes a fourth refractive plate 142, which is rotatably attached to the platform 120 and has the thickness 2W.

In the normal transmission mode, the working orientation "N" of the plate 142 is normal to the actual optical axis 116. Then, the plate 142 does not substantially deviate light rays traveling between the fibers 0–8, 0'–8' and the mirror 80. Thus, the switch 140 reroutes optical signals between the fibers 0–8 and 0'–8' like the switch 110 −5 illustrated by FIGS. 4A–4C in the normal mode.

In the loop back mode, the plate 142 has working orientation "LB" in which the normal to the plate 142 makes an angle Θ with respect to the optical axis 116. The other plates 122–124 have the working orientation E in the loop back mode. For this arrangement of the working orientations, light rays emitted by the central fiber 0 undergo no substantial lateral deviation while propagating towards the mirror 80. Thus, the mirror 118 reflects light received from the fiber 0 back to the paired fiber 0', i.e., a loop back for the port defined by the fibers 0, 0'.

FIG. 7A is side view of an optical switch 150 according to another embodiment of the invention. The optical switch 150 supports both a transmission or switching mode and a loop back mode. The switch 150 has the components and features of the switch 110 as shown in FIGS. 4A–4C. The switch 150 also has paired loop back fibers "L" whose ends are fixed to the platform 120 by clamps and located at the outside boundaries of the rows of fibers 0–8, and 0'–8' on the plane 114. The switch 150 also has another refractive plate 152 of width W whose two binary working orientations "N"and "LB" determine the mode of the switch 150.

In the binary working orientation N, the plate 152 has the normal transmission or switching mode behavior, which is described by the actual optical axis 116 of the mirror 80. In this mode, the plate 152 does not displace rays traveling between the fibers 0–8, 0'–8' and the mirror 80. For this working orientation N, the switch 150 operates in a switching mode as shown in FIGS. 4A–4C.

In the binary working orientation LB, the normal to the plate 152 makes the same angle θ with respect to the optical axis 116 of the mirror 80 as the other plates 122–124. In this mode, the plate 152 causes an added lateral deviation to light rays traveling between the fibers 0–8, 0'–8', LB and the mirror 80.

FIG. 7B is front view of the plane 114 showing the locations of the two loop back fibers L. Each loop back fiber L optically couples together the last ports for fibers in the two rows of fiber ends. Optical signals incoming on the upper end of each loop back fiber L are rerouted back to towards the mirror 80 by the lower end of the same fiber L. An optical signal incoming to the switch 150 from one of the fibers 1–8 and received by one of the fibers L is rerouted back to the interior of switch 150 by the same fiber L. Subsequently, the rerouted optical signal is reflected by the mirror 80 back to the fiber 1'–8' paired to the fiber 1–8 from which the signal originally came into the switch 150. For example, light ray 154 incoming from the fiber 4 is reflected to the lower loop back fiber L which reroutes the light ray back along the same path 154 so that the light reflects off the mirror 80 back to the fiber 4'.

FIG. 7C is a table relating working orientations E and F of the various plates 122–124 in the switch 150 of FIG. 7A and 7B when the plate 152 is in the loop back mode, i.e., the working orientation LB. By choosing the working orientations of the remaining plates 122–124 properly, the switch 150 will loop back an optical signal from any selected one of the fibers 1–8 to the associated fiber 1'–8'.

Other additions, subtractions, and modifications of the described embodiments may be apparent to one of ordinary skill in the art.

What is claimed is:

1. An optical switch for routing optical signals, comprising:
    a plurality of ports located on the optical switch; and
    a refractive plate that may be oriented to passively loop back an optical signal from one of the ports to the same one of the ports.

2. The optical switch of claim 1, wherein each port is adapted to mechanically hold associated first and second optical fiber ends.

3. The optical switch of claim 2, further comprising:
    a reflector positioned to reflect light from one of the first optical fiber ends back to the associated second optical fiber end in response to the refractive plate being oriented to passively loop back.

4. The optical switch of claim 3, wherein the reflector is a focusing mirror.

5. The optical switch of claim 4, wherein the ports are positioned to hold the first and second optical fiber ends along a line substantially perpendicular to an optical axis of the focusing mirror.

6. The optical switch of claim 4, further comprising:
    first and second mechanical stops positioned to stop rotations of the refractive plate at the first and second working orientations, respectively.

7. An optical switch to reroute incoming optical signals, comprising:
    a plurality of ports to attach optical fiber ends;
    a focusing reflector to reflect light incoming from the ports; and
    a plurality of refractive plates located along paths of light rays going from the ports to the focusing reflector, each refractive plate positionable in at least two working orientations, a loop back arrangement of the working orientations rerouting light incoming from one of the ports to the focusing reflector and back to the same one of the ports.

8. The optical switch of claim 7, further comprising:
    a plurality of stops, each stop positioned to stop a rotation of one of the refractive plates at one of the working orientations.

9. The optical switch of claim 8, wherein each port includes two fiber holders to attach two optical fiber ends immovably.

10. The optical switch of claim 9, wherein one of the refractive plates has a different working orientation in transmission and loop back modes of the optical switch.

11. The optical switch of claim 10, wherein the one of the refractive plates is perpendicular to an optical axis of the focusing reflector in the transmission modes.

12. The optical switch of claim 10, further comprising:
    a stop movably positionable to stop the one of the refractive plates in a working orientation corresponding to the loop back mode.

13. The optical switch of claim 12, wherein the one of the refractive plates has three working orientations.

14. The optical switch of claim 7, further comprising:
    a loop back optical fiber positioned to receive the light incoming from the one of the ports in response to the working orientations of the refractive plates being in the loop back arrangement, the loop back optical fiber to transmit the received light back to the focusing reflector.

15. The optical switch of claim 14, wherein the loop back optical fiber reroutes light to respective first and second ports in response to the working orientations of the refractive plates being in first and second loop back arrangements, respectively.

* * * * *